(12) United States Patent
Watanabe et al.

(10) Patent No.: US 11,948,461 B2
(45) Date of Patent: Apr. 2, 2024

(54) INFORMATION PROCESSING DEVICE, INFORMATION PROCESSING METHOD, AND PROGRAM

(71) Applicant: TOYOTA JIDOSHA KABUSHIKI KAISHA, Toyota (JP)

(72) Inventors: Suguru Watanabe, Nagoya (JP); Manabu Nagai, Nagoya (JP); Daisaku Honda, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 99 days.

(21) Appl. No.: 17/731,515

(22) Filed: Apr. 28, 2022

(65) Prior Publication Data

US 2022/0406186 A1 Dec. 22, 2022

(30) Foreign Application Priority Data

Jun. 17, 2021 (JP) ................................ 2021-100646

(51) Int. Cl.
  *G08G 1/16* (2006.01)
  *G06T 7/70* (2017.01)
  *G06V 20/58* (2022.01)

(52) U.S. Cl.
  CPC ............... *G08G 1/16* (2013.01); *G06T 7/70* (2017.01); *G06V 20/58* (2022.01); *G06T 2207/30252* (2013.01)

(58) Field of Classification Search
  CPC .......... G08G 1/16; G08G 1/164; G08G 1/166; G08G 1/0116; G06T 7/70; G06T 2207/30252; G06V 20/58; G06V 20/56
  See application file for complete search history.

(56) References Cited

U.S. PATENT DOCUMENTS

2018/0336787 A1   11/2018  Ohnishi et al.
2021/0370931 A1*  12/2021  Sannomiya ....... B60W 30/0956

FOREIGN PATENT DOCUMENTS

EP   3404638 A1     11/2018
JP   2018-195289 A  12/2018

* cited by examiner

*Primary Examiner* — Daryl C Pope
(74) *Attorney, Agent, or Firm* — Dinsmore & Shohl LLP

(57) ABSTRACT

An information processing device includes: an data acquisition unit that acquires sensor data of an infrastructure sensor; an object information generation unit that generates object information based on the sensor data; a detection range estimation unit that estimates an object detection range based on at least partial information constituting the object information; an intersection determination unit that determines whether the objects intersect with each other within a predetermined time based on at least partial information constituting the object information; and a signal output unit that outputs an intersection avoidance signal when a position of a second object is outside the object detection range of a first object or when the position of the first object is outside the object detection range of the second object.

11 Claims, 9 Drawing Sheets

INFORMATION PROCESSING DEVICE, INFORMATION PROCESSING METHOD, AND PROGRAM

CROSS-REFERENCE TO RELATED APPLICATION

This application claims priority to Japanese Patent Application No. 2021-100646 filed on Jun. 17, 2021, incorporated herein by reference in its entirety.

BACKGROUND

1. Technical Field

The present disclosure relates to an information processing device, an information processing method, and a program, and more particularly to an information processing device, an information processing method, and a program that execute a process using information on a traffic environment.

2. Description of Related Art

There is a demand for provision of a technique to realize safe transportation. In this regard, for example, a vehicle system described in Japanese Unexamined Patent Application Publication No. 2018-195289 (JP 2018-195289 A) controls traveling of a vehicle based on the size of a region where a blind spot region of an infrastructure sensor and a blind spot region of an in-vehicle sensor overlap with each other.

SUMMARY

Traffic participants that are objects moving in the traffic environment are not limited to vehicles. For example, pedestrians and bicycles may be traffic participants. However, in the technique described in JP 2018-195289 A, the traffic is controlled using only the field of view of a driver of the vehicle among the traffic participants, and the fields of view of other traffic participants such as pedestrians and bicycles are not taken into consideration. That is, in this technique, for example, when the object that can possibly intersect (collide) is a traffic participant other than the vehicle such as a pedestrian or a bicycle, the intersection cannot be avoided appropriately.

The present disclosure has been made in the background of the above circumstances, and an object of the present disclosure is to provide an information processing device, an information processing method, and a program capable of appropriately avoiding intersection (collision) between the traffic participants.

One aspect of the present disclosure for achieving the above object is an information processing device including: a data acquisition unit that acquires sensor data from a sensor that is provided in a traffic environment and senses an object present in the traffic environment; an object information generation unit that generates object information that is information for identifying at least a position and movement for each of the objects based on the sensor data; a detection range estimation unit that estimates an object detection range based on at least partial information constituting the object information, the object detection range being a range in which another object is detectable for each of the objects; an intersection determination unit that determines whether the objects intersect with each other within a predetermined time based on at least partial information constituting the object information; a detection range inside-outside determination unit that determines whether a position of a second object, among the objects, identified based on the object information is outside the object detection range of a first object among the objects, and determines whether a position of the first object identified based on the object information is outside the object detection range of the second object, the second object intersecting with the first object within the predetermined time; and a signal output unit that outputs a signal for avoiding intersection between the first object and the second object when the position of the second object is outside the object detection range of the first object or when the position of the first object is outside the object detection range of the second object.

According to the information processing device above, the object detection range, that is, the field of view is estimated for each object (traffic participant) that may possibly intersect. When the opponent intersecting object is present outside the object detection range, the signal for avoiding the intersection is output. Therefore, according to the information processing device, it is possible to appropriately avoid the intersection between the traffic participants.

According to the above aspect, the detection range estimation unit may estimate the object detection range from which a blind spot region created by an obstacle identified based on three-dimensional map information on the traffic environment is excluded.

With such a configuration, it is possible to acquire the object detection range in consideration of the blind spot created by the obstacle indicated by the map information. Therefore, it is possible to more appropriately determine whether each object (traffic participant) can detect the opponent intersecting object. Therefore, it is possible to avoid the intersection between the traffic participants more appropriately.

According to the above aspect, the detection range estimation unit may estimate the object detection range from which a blind spot region created by the object for which the object information is generated is excluded.

With such a configuration, it is possible to acquire the object detection range in consideration of the blind spot created by the obstacle that is temporarily present in the traffic environment. Therefore, it is possible to more appropriately determine whether each object (traffic participant) can detect the opponent intersecting object. Therefore, it is possible to avoid the intersection between the traffic participants more appropriately.

According to the above aspect, the object information generation unit may generate the object information that also identifies a type of the object, and the detection range estimation unit may estimate the object detection range based on a default detection range prepared for each type of the object.

With such a configuration, the object detection range can be obtained in accordance with the type of the object. Therefore, it is possible to more appropriately determine whether each object (traffic participant) can detect the opponent intersecting object. Therefore, it is possible to avoid intersection between the traffic participants more appropriately.

According to the above aspect, the data acquisition unit may further acquire sensor data of an in-vehicle sensor that senses an object around a vehicle present in the traffic environment and a position of the vehicle from the vehicle, and the detection range estimation unit may estimate the object detection range of the object that is a vehicle based on the sensor data of the in-vehicle sensor and the position of the vehicle acquired from the vehicle.

With such a configuration, the object detection range of the vehicle is identified from the data of the in-vehicle sensor. Therefore, the actual object detection range of the vehicle can be identified.

According to the above aspect, the data acquisition unit may further acquire route information of a vehicle present in the traffic environment from the vehicle, and the intersection determination unit may determine whether the vehicle intersects with another object within a predetermined time using the route information of the vehicle.

With such a configuration, the scheduled route for movement of the vehicle can be acquired. Therefore, occurrence of the intersection can be determined more accurately.

According to the above aspect, when the position of the second object is outside the object detection range of the first object and the position of the first object is outside the object detection range of the second object, the signal output unit may output the signal different from the signal to be output when the position of the second object is within the object detection range of the first object and the position of the first object is outside the object detection range of the second object.

With such a configuration, when neither of the intersecting objects can detect the opponent intersecting object, a signal different from the signal to be output when only one of the intersecting objects cannot detect the opponent intersecting object can be output. Therefore, when the risk is higher, a special signal can be output.

According to the above aspect, the signal output unit may output a signal instructing an output device provided in the traffic environment to output a message urging avoidance of intersection as the signal for avoiding the intersection between the first object and the second object.

With such a configuration, a message urging avoidance of the intersection is output from the output device provided in the traffic environment. Therefore, it is possible to call attention to the traffic participants.

According to the above aspect, the signal output unit may output a signal instructing an output device provided in the first object or the second object to output a message urging avoidance of intersection as the signal for avoiding the intersection between the first object and the second object.

With such a configuration, a message urging avoidance of the intersection is output from the output device provided in the object (provided for traffic participant). Therefore, it is possible to directly call attention to the traffic participants.

According to the above aspect, the signal output unit may output a signal instructing a control device that controls movement of the first object or the second object to execute control to avoid intersection as the signal for avoiding the intersection between the first object and the second object.

With such a configuration, when there is a risk of intersection, it is possible to control the movement of the object (traffic participant) that is the party concerned. Therefore, the intersection (collision) can be avoided more reliably.

Another aspect of the present disclosure for achieving the above object is an information processing method including: acquiring sensor data from a sensor that is provided in a traffic environment and senses an object present in the traffic environment; generating object information that is information for identifying at least a position and movement for each of the objects based on the sensor data; estimating an object detection range based on at least partial information constituting the object information, the object detection range being a range in which another object is detectable for each of the objects; determining whether the objects intersect with each other within a predetermined time based on at least partial information constituting the object information; determining whether a position of a second object, among the objects, identified based on the object information is outside the object detection range of a first object among the objects, and determines whether a position of the first object identified based on the object information is outside the object detection range of the second object, the second object intersecting with the first object within the predetermined time; and outputting a signal for avoiding intersection between the first object and the second object when the position of the second object is outside the object detection range of the first object or when the position of the first object is outside the object detection range of the second object.

According to the information processing method, the object detection range, that is, the field of view is estimated for each object (traffic participant) that may possibly intersect. When the opponent intersecting object is present outside the object detection range, the signal for avoiding the intersection is output. Therefore, according to the information processing method, it is possible to appropriately avoid intersection between the traffic participants.

Another aspect of the present disclosure to achieve the above object is a program that causes a computer to execute steps including: a data acquisition step of acquiring sensor data from a sensor that is provided in a traffic environment and senses an object present in the traffic environment; an object information generation step of generating object information that is information for identifying at least a position and movement for each of the objects based on the sensor data; a detection range estimation step of estimating an object detection range based on at least partial information constituting the object information, the object detection range being a range in which another object is detectable for each of the objects; an intersection determination step of determining whether the objects intersect with each other within a predetermined time based on at least partial information constituting the object information; a detection range inside-outside determination step of determining whether a position of a second object, among the objects, identified based on the object information is outside the object detection range of a first object among the objects, and determines whether a position of the first object identified based on the object information is outside the object detection range of the second object, the second object intersecting with the first object within the predetermined time; and a signal output step of outputting a signal for avoiding intersection between the first object and the second object when the position of the second object is outside the object detection range of the first object or when the position of the first object is outside the object detection range of the second object.

According to the program, the object detection range, that is, the field of view is estimated for each object (traffic participant) that may possibly intersect. When the opponent intersecting object is present outside the object detection range, the signal for avoiding the intersection is output. Therefore, according to the program, it is possible to appropriately avoid the intersection between the traffic participants.

According to the present disclosure, an information processing device, an information processing method, and a program capable of appropriately avoiding intersection (collision) between the traffic participants can be provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described with reference to the drawings. In the present disclosure, a field of view is not limited to a detection range by human vision, but also means a detection range by a sensor.

Figure 1:
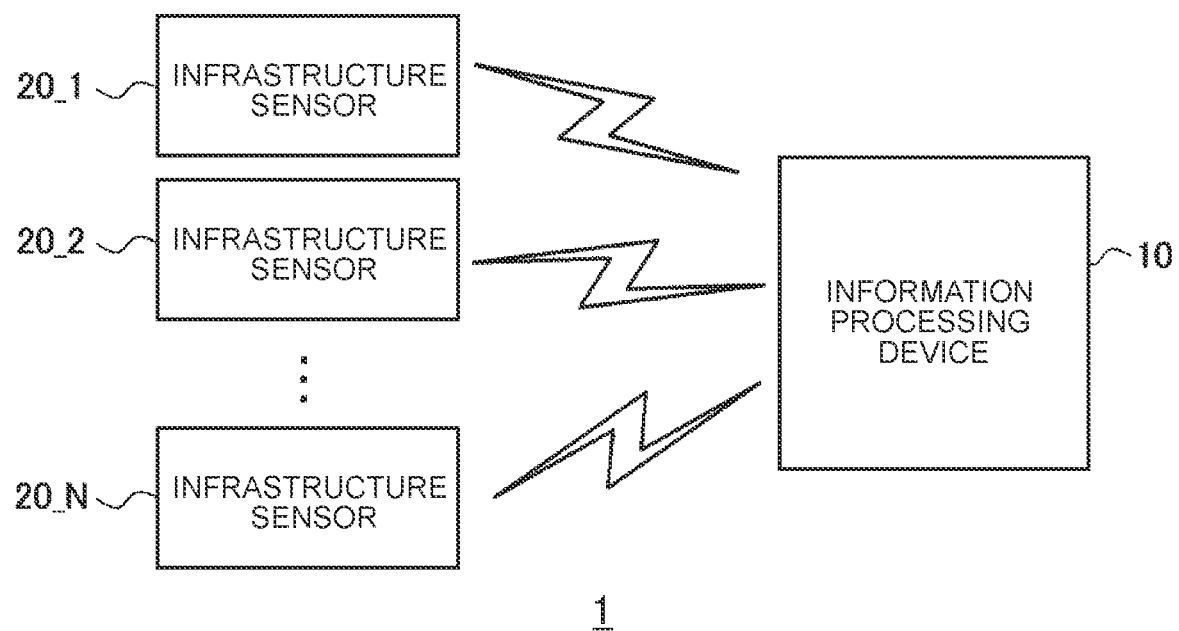
FIG. 1 is a block diagram showing a configuration example of a transportation system according to an embodiment.

FIG. 1 is a block diagram showing a configuration example of a transportation system 1 according to an embodiment. The transportation system 1 includes an information processing device 10, infrastructure sensors 20_1, 20_2, . . . 20_N. In an example shown in FIG. 1, the transportation system 1 includes N infrastructure sensors 20. However, the transportation system 1 only needs to include one or more infrastructure sensors 20, and the number thereof is not particularly limited. That is, N is an integer of 1 or more. Note that, in the following description, when the infrastructure sensors 20_1, 20_2, . . . 20_N are referred without particular distinction, the infrastructure sensors are referred to as the infrastructure sensor 20. The infrastructure sensor 20 and the information processing device 10 are each provided with a communication function, and the infrastructure sensor 20 and the information processing device 10 are connected to a network. Therefore, the infrastructure sensor 20 and the information processing device 10 are communicably connected via the network.

The infrastructure sensor 20 is a sensor provided in a traffic environment and senses an object present in the traffic environment. For example, the infrastructure sensors 20_1, 20_2, . . . 20_N are distributed and arranged in the traffic environment to comprehensively sense the traffic environment. Note that, the infrastructure sensor 20 is fixedly provided on the side of a road, for example. However, the infrastructure sensor 20 may be mounted on a moving body such as a drone. Specifically, the infrastructure sensor 20 may be, for example, a visible light camera, a light detection and ranging (LiDAR) sensor, or a millimeter-wave radar. Note that, the specific configuration of the infrastructure sensor 20 is not limited to the above. The infrastructure sensor 20 transmits sensor data that is information on the sensing result to the information processing device 10.

The information processing device 10 is a device that acquires information on the traffic environment and generates a signal (hereinafter referred to as an intersection avoidance signal) for avoiding intersection (collision) between objects (traffic participants) in the traffic environment. The details of the information processing device 10 will be described later. Note that, the information processing device 10 is installed at any given place such as a data center.

Figure 2:
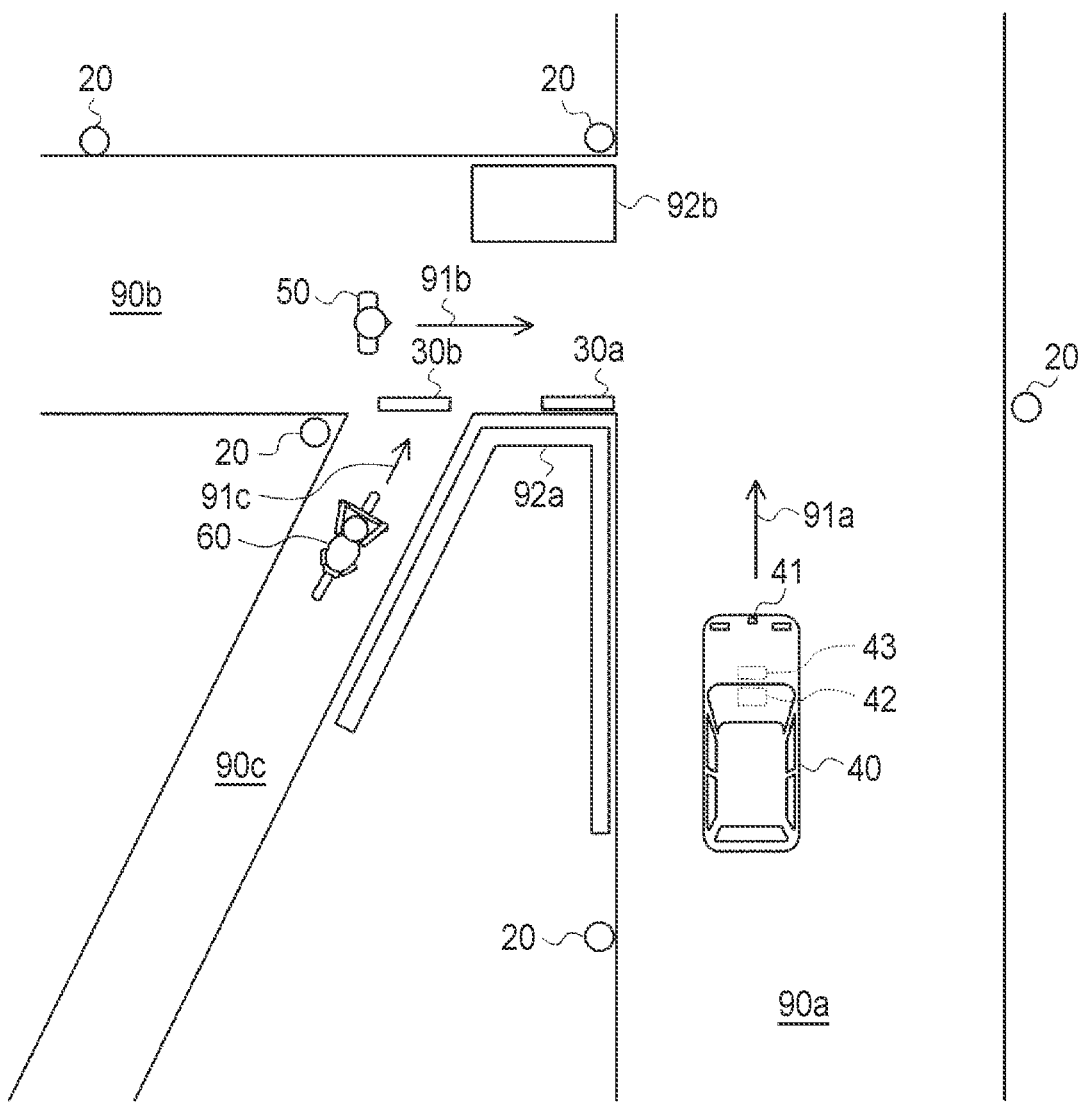
FIG. 2 is a schematic diagram showing an example of a traffic environment.

FIG. 2 is a schematic diagram showing an example of the traffic environment. The traffic environment shown as an example in FIG. 2 includes a road 90a, a road 90b, and a road 90c. Further, in the example shown in FIG. 2, a vehicle 40 is moving in the direction indicated by an arrow 91a on the road 90a. Further, a pedestrian 50 is moving on the road 90b in the direction indicated by an arrow 91b. Further, a bicycle 60 is moving on the road 90c in the direction indicated by an arrow 91c. Further, in the traffic environment shown in FIG. 2, the infrastructure sensors 20 are dispersedly installed, and comprehensively sense the traffic environment.

Further, the traffic environment shown in FIG. 2 includes an obstacle 92a and an obstacle 92b. The obstacle 92a is an object that is permanently present in the traffic environment and creates a blind spot for the traffic participants. In other words, the obstacle 92a is an obstacle reflected in map information that will be described later. For example, the obstacle 92a may be a building, a fence, a utility pole, or the like. In the environment shown in FIG. 2, as an example, the obstacle 92a is a fence installed along the road 90a, the road 90b, and the road 90c. The obstacle 92b is an object that is temporarily present in the traffic environment and creates a blind spot for the traffic participants. In other words, the obstacle 92b is an obstacle that is not reflected in the map information that will be described later. For example, the obstacle 92b may be a vehicle parked on the road or a baggage left on the road. In the environment shown in FIG. 2, as an example, the obstacle 92b is a vehicle parked beside the road 90b.

Further, in the traffic environment shown in FIG. 2, an output device 30a and an output device 30b are provided. The output device 30a and the output device 30b are devices that output a message to the traffic participant. The message may be output by outputting an image or may be output by outputting a sound. That is, the output device 30a and the output device 30b may be configured to include a display or may be configured to include a speaker. The message does not have to be a word, and may be a lighting of a lamp calling attention or an alarm sound calling attention. Further, the output device 30a and the output device 30b may be a warning light or an electric bulletin board. In the example shown in FIG. 2, the output device 30a and the output device 30b are set on the road surface, but may be installed at a position away from the road surface. Note that, in the example shown in FIG. 2, specifically, the output device 30a is provided near a connection point between the road 90a and the road 90b, and the output device 30b is provided near a connection point between the road 90b and the road 90c. In the example shown in FIG. 2, two output devices 30a and 30b are shown. However, any given number of output devices may be provided at any given positions in the traffic environment.

Further, in the example shown in FIG. 2, the vehicle 40 includes an in-vehicle sensor 41 that senses an object around the vehicle 40. In the example shown in FIG. 2, the in-vehicle sensor 41 is a sensor that senses the front of the vehicle 40. However, the in-vehicle sensor may be a sensor that senses the rear or a sensor that senses the side. Specifically, the in-vehicle sensor 41 may be, for example, a visible light camera, a LiDAR sensor, or a millimeter-wave radar. Note that, the specific configuration of the in-vehicle sensor 41 is not limited to the above.

Further, the vehicle 40 includes an output device 42 that outputs a message to an occupant (for example, a driver) of the vehicle 40. Note that, also in the output device 42, the message may be output by outputting an image or may be output by outputting a sound. That is, the output device 42 may be configured to include a display or may be configured to include a speaker. Further, the vehicle 40 includes a control device 43 that controls various operations including the movement of the vehicle 40. In the example shown in FIG. 2, the vehicle 40 includes an in-vehicle sensor 41, an output device 42, and a control device 43. However, the vehicle 40 may include only a part of the above, and all of them may not be provided.

The infrastructure sensor 20, the in-vehicle sensor 41, the output devices 30a, 30b, 42, and the control device 43 are all connected to the network and can communicate with the information processing device 10. The in-vehicle sensor 41, the output device 42, the control device 43, and the vehicle 40 may be connected to the network via communication devices mounted thereon. The sensor data of the infrastructure sensor 20 and the in-vehicle sensor 41 are sequentially transmitted to the information processing device 10.

The sensor data of the in-vehicle sensor 41 may include the sensing direction of the in-vehicle sensor 41. Note that, in embodiments, to uniquely identify the sensing direction in the traffic environment, the sensing direction included in the sensor data is the direction in the absolute coordinate system. The sensor data of the in-vehicle sensor 41 is transmitted together with the position information of the vehicle 40. In addition to the sensor data of the in-vehicle sensor 41 and the position information of the vehicle 40, the movement information of the vehicle 40 (for example, information on the moving speed of the vehicle 40 and information on the moving direction) may be transmitted to the information processing device 10. In embodiments, the information on the moving direction is information indicating the direction in the absolute coordinate system such as the moving direction of the vehicle 40 on the map. That is, in embodiments, the information on the moving direction is information that uniquely identifies the moving direction in the traffic environment. Therefore, the sensor data of the in-vehicle sensor 41 may be transmitted to the information processing device 10 together with the information indicating the position and movement of the vehicle 40 at the time of sensing by the in-vehicle sensor 41. Note that, the information such as the position and movement of the vehicle 40 is managed by, for example, the control device 43. The position information and the movement information of the vehicle 40 may be transmitted to the information processing device 10 regardless of whether the sensor data of the in-vehicle sensor 41 is transmitted.

Further, when the control device 43 generates the route information indicating the route on which the vehicle 40 is scheduled to move, the control device 43 may transmit the route information to the information processing device 10. Here, the route information only needs to be any information indicating the scheduled movement route, and may include information indicating route information for each wheel of the vehicle 40 (that is, information indicating a scheduled trajectory of each wheel). Note that, the information transmitted from the vehicle 40 may include identification information of the vehicle 40 (for example, information for identifying a vehicle type (model)).

When the output devices 30a, 30b, and 42 receive the intersection avoidance signal for outputting a message from the information processing device 10, the output devices 30a, 30b, and 42 respectively output a message in accordance with the received intersection avoidance signal. Further, when the control device 43 receives the intersection avoidance signal for movement control from the information processing device 10, the control device 43 controls the movement of the vehicle 40 based on the received intersection avoidance signal.

Figure 3:
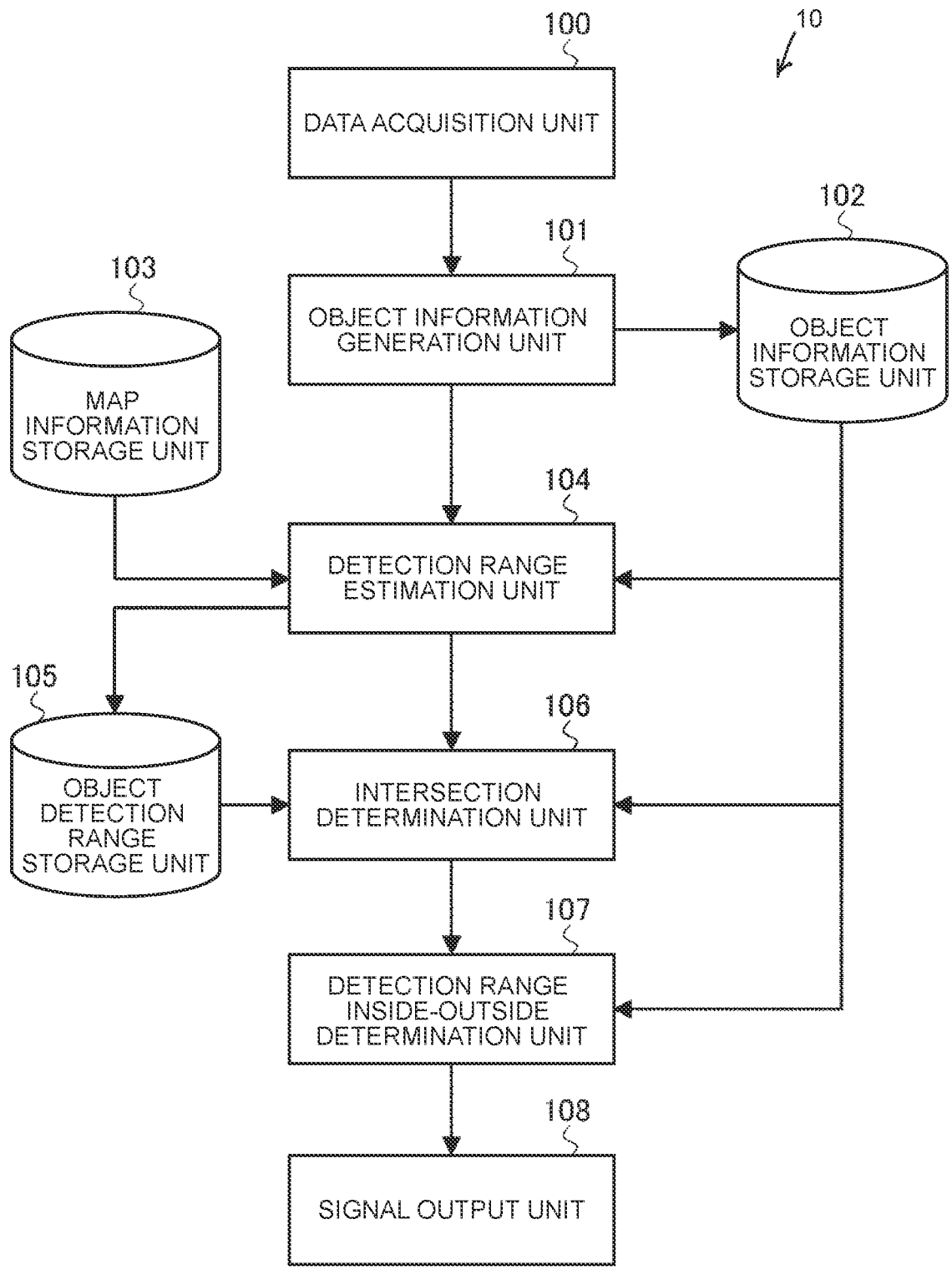
FIG. 3 is a block diagram showing a functional configuration of an information processing device according to the embodiment.

Next, the details of the information processing device 10 will be described. FIG. 3 is a block diagram showing an example of the functional configuration of the information processing device 10. As shown in FIG. 3, the information processing device 10 includes a data acquisition unit 100, an object information generation unit 101, an object information storage unit 102, a map information storage unit 103, a detection range estimation unit 104, an object detection range storage unit 105, an intersection determination unit 106, a detection range inside-outside determination unit 107, and a signal output unit 108.

The data acquisition unit 100 acquires the sensor data of the infrastructure sensor 20. Further, the data acquisition unit 100 acquires various types of information from a vehicle capable of transmitting information. Specifically, the data acquisition unit 100 acquires the sensor data of the in-vehicle sensor 41 and the position of the vehicle 40 from the vehicle 40 when possible. Further, the data acquisition unit 100 acquires the movement information of the vehicle 40 (the moving direction of the vehicle 40 and the moving speed of the vehicle 40) from the vehicle 40 when possible. Further, the data acquisition unit 100 acquires the route information of the vehicle 40 from the vehicle 40 when possible.

The object information generation unit 101 generates object information for each object present in the traffic environment. Here, the object information is information that identifies at least the position and movement of the object. The information that identifies the movement is, for example, the moving direction and the moving speed of the object. The object information generation unit 101 generates object information at least for an object (traffic participant) moving in the traffic environment. However, the object information generation unit 101 may generate object information for a stationary object such as an obstacle present in the traffic environment (for example, the obstacle 92b that is a temporary obstacle).

The object information generation unit 101 generates the object information based on, for example, the sensor data of the infrastructure sensor 20. Specifically, the object information generation unit 101 identifies the position of the object in the traffic environment using the installation position of the infrastructure sensor 20 and the relative position of the object with respect to the infrastructure sensor 20 that is identified from the sensor data of the infrastructure sensor 20. The installation position of the infrastructure sensor 20 is known in advance, and may further include the sensing direction of the infrastructure sensor 20. Further, the object information generation unit 101 identifies the movement (the moving speed and the moving direction) of the object by identifying transition of the position of the object from the time series data of the sensor data. Note that, when a plurality of the infrastructure sensors 20 senses the same object, the object information generation unit 101 may generate the object information after integrating the sensor data based on a feature amount of the object.

When the data acquisition unit 100 acquires the position information and the movement information of the vehicle 40 from the vehicle 40, the object information generation unit 101 may generate the object information on the vehicle 40 from the information acquired from the vehicle 40. That is, the object information generation unit 101 may use the position information and the movement information acquired from the vehicle 40 as the object information of the vehicle 40. Note that, the object information generation unit 101 may use any one of the position information and the movement information acquired from the vehicle 40 as the object information of the vehicle 40.

The object information may further include information that identifies the type of the object. Here, the type of the object is information that identifies the type of the traffic participant. For example, the information that identifies the type of the object may be information indicating whether the object corresponds to a vehicle, a bicycle, or a pedestrian. Further, when the object is a vehicle, the information that identifies the type of the object may include the information that identifies the vehicle type (model). Specifically, the object information generation unit 101 analyzes the sensor data of the infrastructure sensor 20 and identifies the type of the object. For example, the object information generation unit 101 identifies the type of the object by applying pattern matching processing. Note that, when the data acquisition unit 100 acquires the identification information of the vehicle 40 from the vehicle 40, the object information generation unit 101 may specify the type of the object from the identification information acquired from the vehicle 40.

The object information may include other information. For example, the object information may include information that identifies the orientation of the face or the orientation of the line of sight of the pedestrian, a rider of the bicycle, or the driver of the vehicle. In this case, the object information generation unit 101 analyzes the sensor data, for example, and identifies the orientation of the face or the orientation of the line of sight. Further, the object information may include information for specifying the size of the object (obstacle). In this case, the object information generation unit 101 analyzes the sensor data, for example, and identifies the size of the object.

The object information storage unit 102 stores the object information generated by the object information generation unit 101. The object information generation unit 101 stores the generated object information in the object information storage unit 102.

The map information storage unit 103 stores three-dimensional map information on the traffic environment created in advance. The three-dimensional map information is information representing a map on which a three-dimensional model of a structure present in a traffic environment is arranged. The three-dimensional map information includes a three-dimensional model of the obstacle (obstacle 92*a*) that is permanently present in the traffic environment. Therefore, by referring to the three-dimensional map information, it is possible to identify the position and shape of the obstacle that is permanently present in the traffic environment.

The detection range estimation unit 104 estimates the object detection range for each object present in the traffic environment. The detection range estimation unit 104 may estimate the object detection range only for a moving object of which object type corresponds to a predetermined type (for example, a vehicle, a bicycle, or a pedestrian). Here, the object detection range is a range in which other objects present in the traffic environment can be detected. For example, the object detection range of the pedestrian means the area visually recognized by the pedestrian. The object detection range of the bicycle means the area visually recognized by the rider of the bicycle. The object detection range of the vehicle is the area detected by the in-vehicle sensor 41 of the vehicle or the area visually recognized by the driver of the vehicle.

The detection range estimation unit 104 estimates the object detection range with reference to the object information generated by the object information generation unit 101. Note that, the detection range estimation unit 104 only needs to estimate the object detection range based on at least partial information constituting the object information, and may not necessarily use all types of information constituting the object information for estimating the object detection range.

Figure 4:
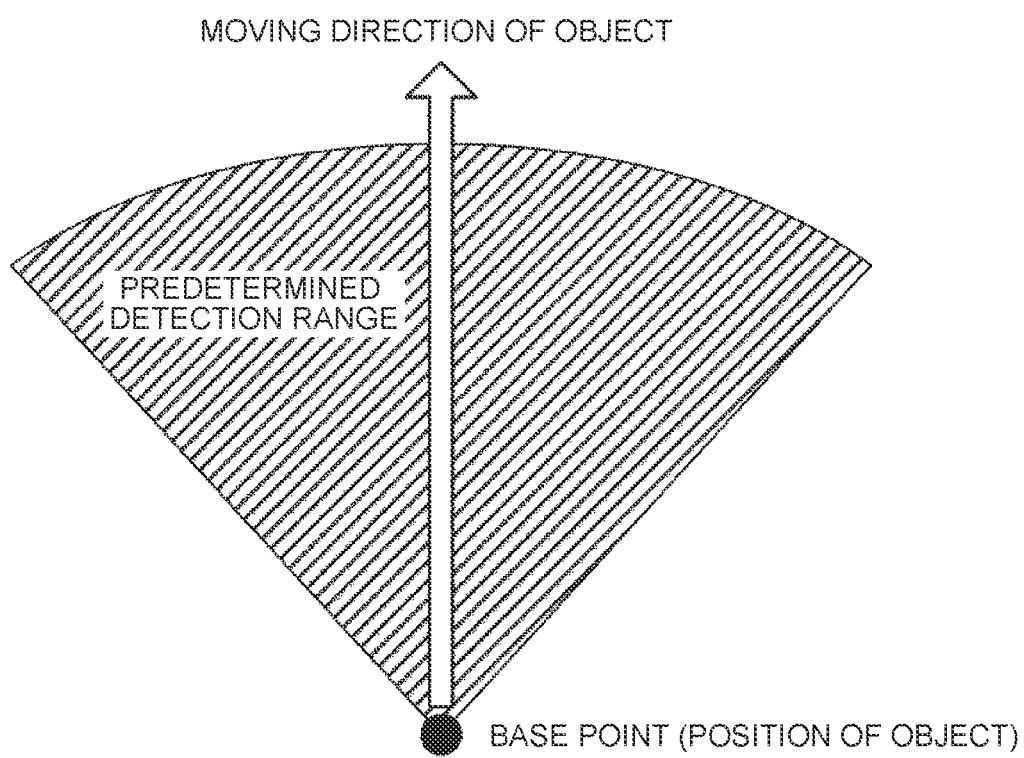
FIG. 4 is a schematic diagram showing an example of a predetermined detection range.

For example, the detection range estimation unit 104 estimates the object detection range of the object using the position information of the object and the movement information of the object (specifically, the moving direction). Specifically, for example, the detection range estimation unit 104 estimates the object detection range in the traffic environment by arranging a predetermined detection range in a three-dimensional space representing a traffic environment (for example, a three-dimensional space represented by the three-dimensional map information) as described below. Here, the predetermined detection range means a default detection range in which the shape of the region is preset. The predetermined detection range has, for example, a fan-shaped region as shown in FIG. 4. However, other shapes may be adopted. For example, as shown in FIG. 4, the detection range estimation unit 104 estimates the object detection range by arranging the predetermined detection range as to be arranged along the moving direction of the object while using the position of the object in the three-dimensional space as the base point of the arrangement of the predetermined detection range. Note that, the arrangement of the predetermined detection range shown in FIG. 4 is only an example, and other arrangements may be adopted. For example, the predetermined detection range may be arranged along the orientation of the face or the orientation of the line of sight.

The shape and size of the predetermined detection range may differ depending on the type of the object. For example, as the predetermined detection range for the pedestrian, a general range of the field of view of the pedestrian may be set as the predetermined detection range. As the predetermined detection range for the bicycle, a general range of the field of view of the rider of the bicycle may be set as the predetermined detection range. Similarly, as the predetermined detection range for the vehicle, the general range of the field of view of the driver of the vehicle may be set as the predetermined detection range, or the general detection range of the in-vehicle sensor 41 of the vehicle may be set as the predetermined detection range. Further, when the vehicle type (model) is identified, the detection range of the in-vehicle sensor 41 identified in accordance with the vehicle type (model) may be used as the predetermined detection range. As described above, the detection range estimation unit 104 may estimate the object detection range based on the default detection range prepared for each type of the object. With such a configuration, an appropriate object detection range can be obtained in accordance with the type of the object. Note that, the predetermined detection range may differ depending on any other parameter. For example, the shape or the size of the predetermined detection range may be changed in accordance with the moving speed of the object.

Further, when the data acquisition unit 100 acquires the sensor data of the in-vehicle sensor 41 from the vehicle 40 and the position of the vehicle 40, the detection range estimation unit 104 may estimate the object detection range of the vehicle 40 based on the sensor data acquired from the vehicle 40 and the position of the vehicle 40. The sensor data of the in-vehicle sensor 41 is actually the detection result by the in-vehicle sensor 41 of the vehicle 40. Therefore, the object detection range of the vehicle 40 can be identified from the sensor data as long as the position where the detection result is acquired, that is, the position of the vehicle 40, and the sensing direction of the in-vehicle sensor 41 can be identified. Note that, the sensor data of the in-vehicle sensor 41 may or may not include the sensing direction of the in-vehicle sensor 41 in the absolute coordinate system (traffic environment). When the sensor data of the in-vehicle sensor 41 does not include the sensing direction in the absolute coordinate system (traffic environment), the detection range estimation unit 104 may estimate the sensing direction of the in-vehicle sensor 41 from the orientation of the vehicle 40. For example, the detection range estimation unit 104 may estimate that the sensor data of the in-vehicle sensor 41 is the data acquired by sensing the front of the vehicle 40. In this case, the orientation of the vehicle 40 in the absolute coordinate system (traffic environment) may be determined by analyzing the sensor data of the infrastructure sensor 20 that senses the vehicle 40. As described above, the actual object detection range of the vehicle 40 can be acquired by identifying the object detection range of the vehicle 40 from the sensor data of the in-vehicle sensor 41.

Further, the detection range estimation unit 104 may estimate the object detection range from which the blind spot region created by the obstacle is excluded. For example, the detection range estimation unit 104 may estimate the object detection range from which the blind spot region created by the obstacle identified by the three-dimensional map information stored in the map information storage unit 103 is excluded. In this case, specifically, the detection range estimation unit 104 estimates the blind spot region of the object geometrically based on, for example, the position of the object (that is, the position of the viewpoint of the driver or the in-vehicle sensor 41) and the position of the obstacle identified by the three-dimensional map information. Note that, at this time, the detection range estimation unit 104 may estimate the blind spot region with reference to the size of the obstacle. When the detection range estimation unit 104 estimates the blind spot region of the object, the detection range estimation unit 104 estimates the actual object detection range by excluding the blind spot region from the object detection range. With such a configuration, it is possible to acquire the object detection range in consideration of the blind spot created by the obstacle indicated by the map information.

Further, for example, the detection range estimation unit 104 may estimate the object detection range from which the blind spot region created by the object (obstacle) for which the object information is generated by the object information generation unit 101 is excluded. In this case, specifically, the detection range estimation unit 104 estimates the blind spot region of the object geometrically based on, for example, the position of the object (that is, the position of the viewpoint of the driver or the in-vehicle sensor 41) and the position of the obstacle identified by the object information. Note that, at this time, the detection range estimation unit 104 may estimate the blind spot region with reference to the size of the obstacle. When the detection range estimation unit 104 estimates the blind spot region of the object, the detection range estimation unit 104 estimates the actual object detection range by excluding the blind spot region from the object detection range. With such a configuration, it is possible to acquire the object detection range in consideration of the blind spot created by the obstacle that is temporarily present in the traffic environment.

The object detection range storage unit 105 stores the object detection range for each object estimated by the detection range estimation unit 104. The detection range estimation unit 104 stores the estimated object detection range in the object detection range storage unit 105.

Figure 5:
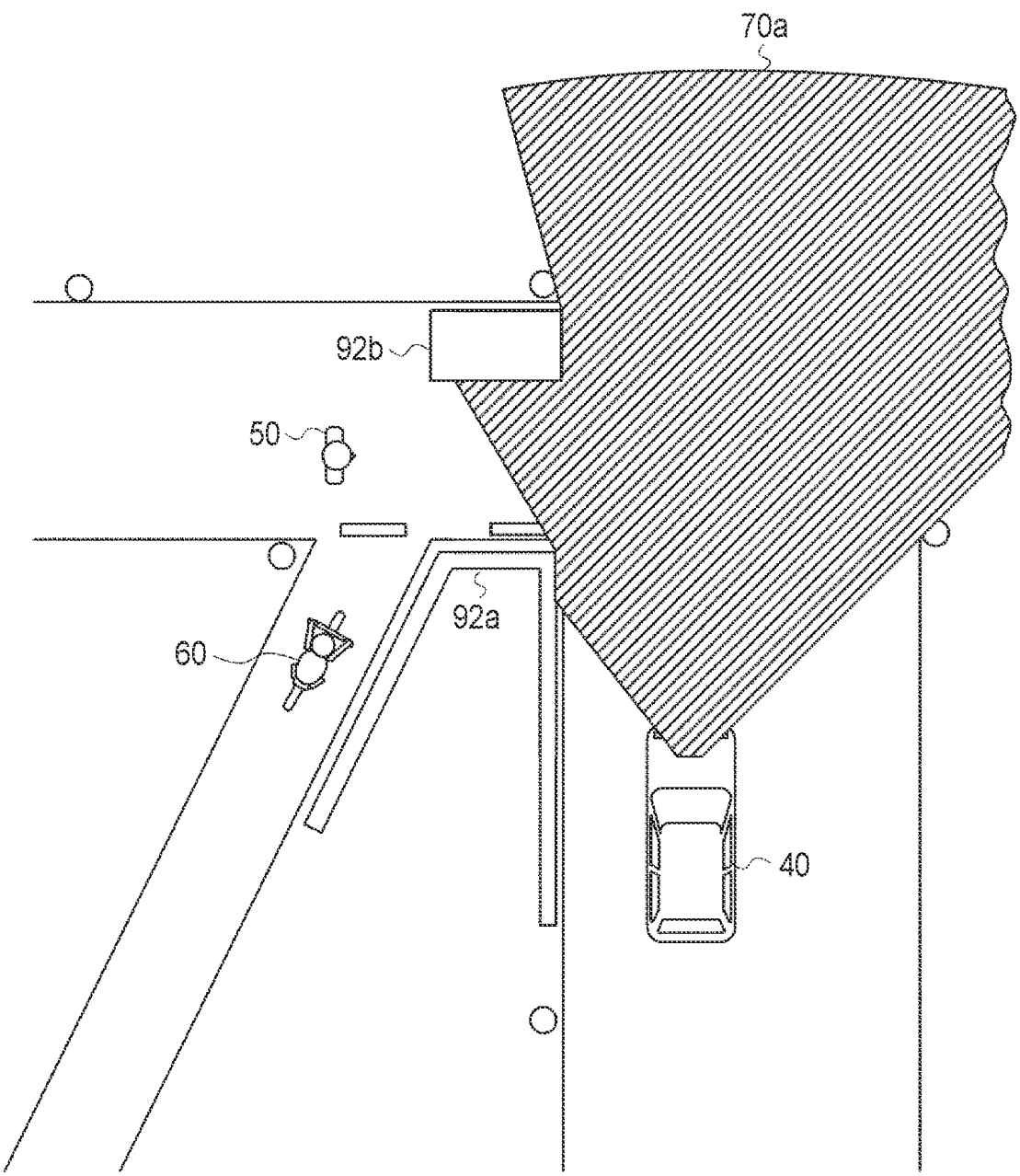
FIG. 5 is a schematic diagram showing an object detection range of a vehicle.

FIG. 5 is a schematic diagram showing an object detection range 70*a* of the vehicle 40 moving on the road 90*a*. As shown in FIG. 5, the object detection range 70*a* of the vehicle 40 is affected by the blind spots created by the obstacles 92*a* and 92*b*. The pedestrian 50 and the bicycle 60 are present outside the object detection range 70*a*. That is, the pedestrian 50 and the bicycle 60 are not recognized by the vehicle 40.

Figure 6:
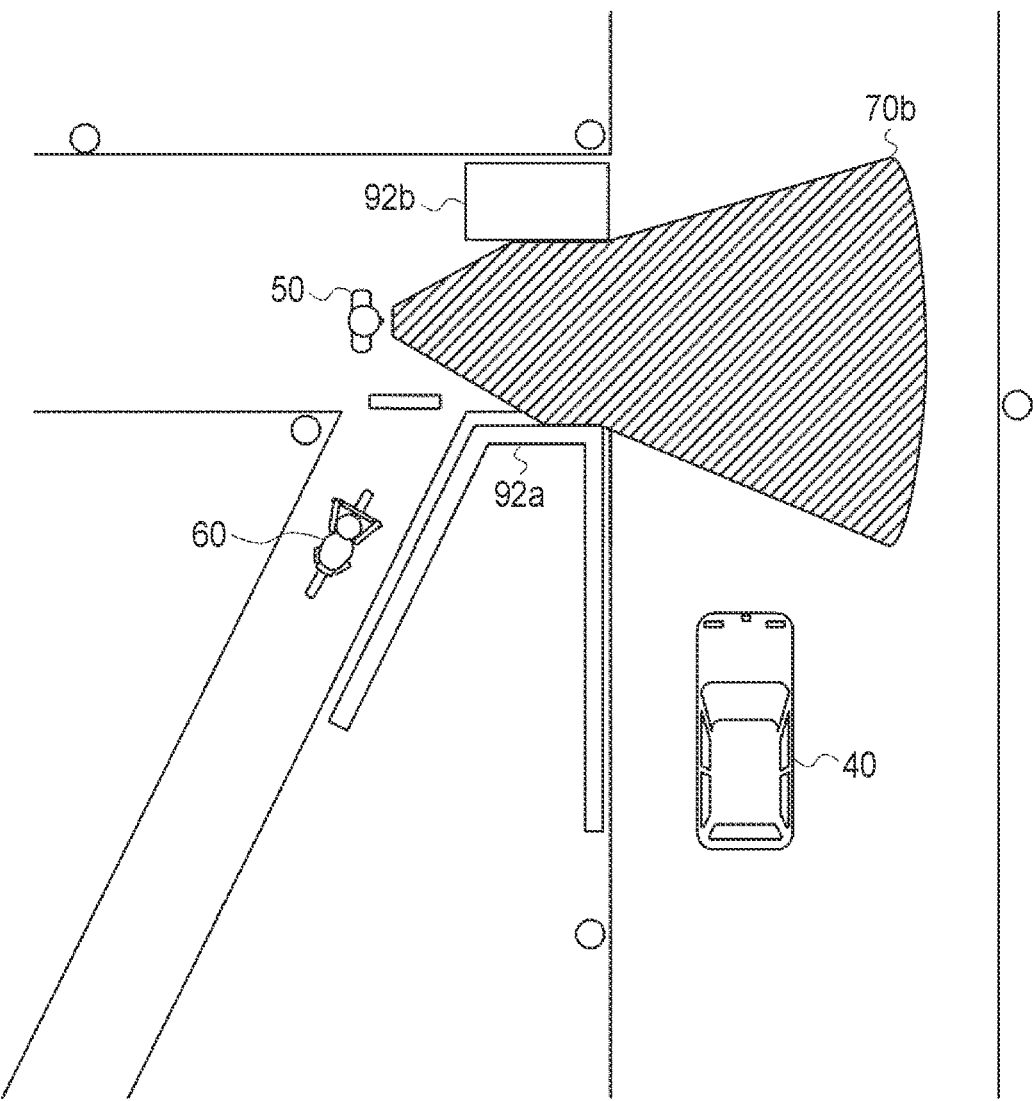
FIG. 6 is a schematic diagram showing an object detection range of a pedestrian.

FIG. 6 is a schematic diagram showing an object detection range 70*b* of the pedestrian 50 moving on the road 90*b*. As shown in FIG. 6, the object detection range 70*b* of the pedestrian 50 is affected by the blind spots created by the obstacles 92*a* and 92*b*. The vehicle 40 and the bicycle 60 are present outside the object detection range 70*b*. That is, the vehicle 40 and the bicycle 60 are not recognized by the pedestrian 50.

Figure 7:
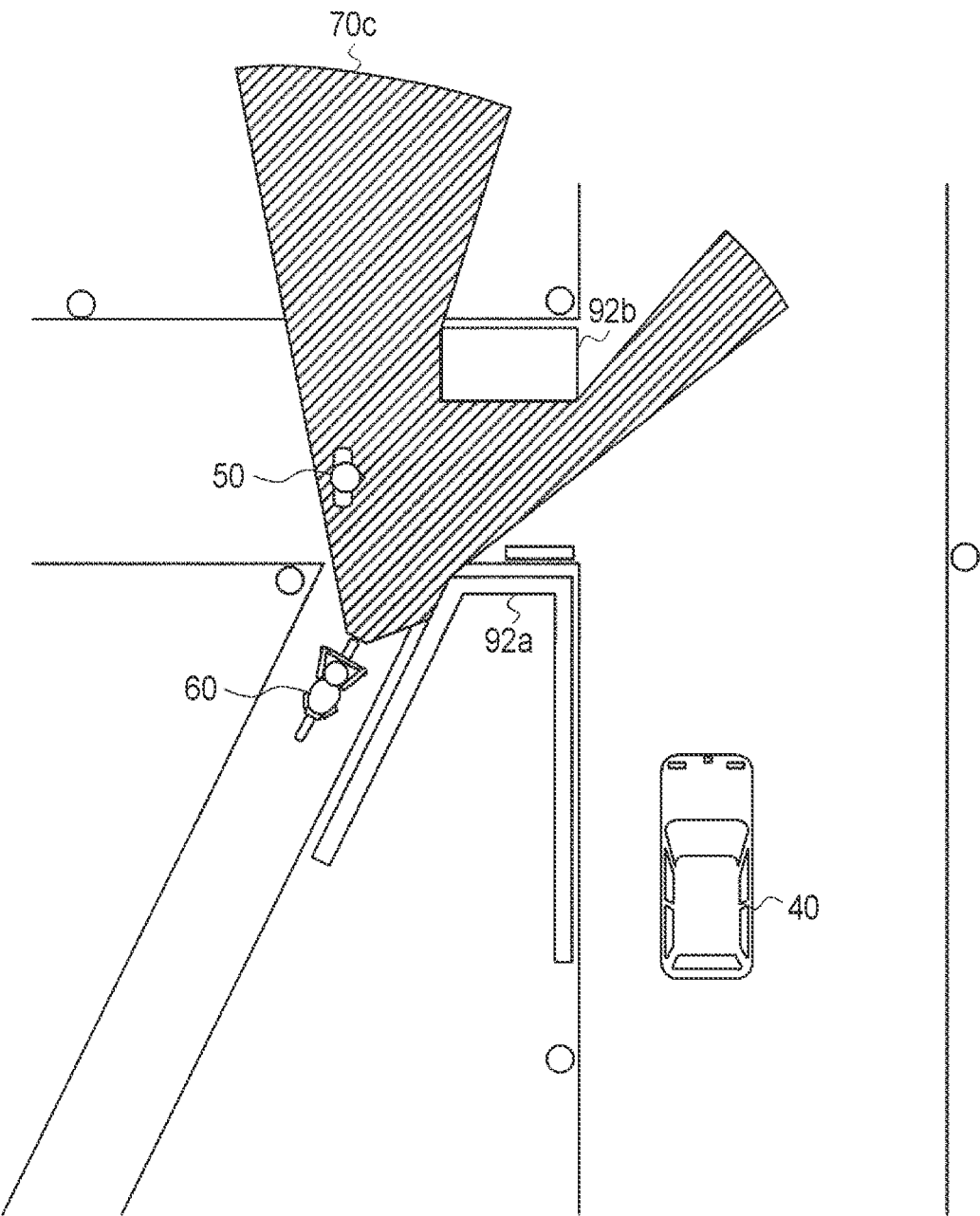
FIG. 7 is a schematic diagram showing an object detection range of a bicycle.

FIG. 7 is a schematic diagram showing an object detection range 70*c* of the bicycle 60 moving on the road 90*c*. As shown in FIG. 7, the object detection range 70*c* of the bicycle 60 is affected by the blind spots created by the obstacles 92*a* and 92*b*. Then, the pedestrian 50 is present in the object detection range 70*c*, but the vehicle 40 is present outside the object detection range 70*c*. That is, the pedestrian 50 is recognized by the bicycle 60, but the vehicle 40 is not recognized by the bicycle 60.

The intersection determination unit 106 determines whether the objects present in the traffic environment intersect (collide) with each other. Specifically, the intersection determination unit 106 determines whether the objects of which object detection ranges are estimated intersect (collide) with each other within a predetermined time (for example, within 10 seconds). The intersection determination unit 106 determines whether the objects intersect with each other within the predetermined time based on at least partial information constituting the object information. Specifically, for example, the intersection determination unit 106 predicts, for each object, transition of the position of the object from the present time until the predetermined time elapses based on the current position, the current moving direction, and the current moving speed of the object. Then, the intersection determination unit 106 determines whether a difference between the predicted positions of two or more objects at the same time is equal to or less than a predetermined threshold value. With this configuration, the intersection determination unit 106 determines whether the objects intersect (collide) with each other. Note that, when the route information of the vehicle 40 is acquired, the intersection determination unit 106 may determine whether the vehicle 40 intersects with another object within the predetermined time using the route information of the vehicle 40. That is, the transition of the position of the vehicle 40 may be identified based on the route information. With such a configuration, occurrence of the intersection can be determined more accurately.

The detection range inside-outside determination unit 107 determines whether each of the objects determined to intersect with each other by the intersection determination unit 106 can recognize the opponent intersecting object. When the opponent intersecting object is present outside the object detection range, it means that the opponent intersecting object is not recognized. Therefore, the detection range inside-outside determination unit 107 specifically executes the following process. In the following description, one of the objects determined by the intersection determination unit 106 to intersect with each other within the predetermined time is referred to as a first object, and the other object is referred to as a second object.

The detection range inside-outside determination unit 107 determines whether the position identified by the object information on the second object is outside the object detection range of the first object. With this configuration, the detection range inside-outside determination unit 107 determines whether the second object can be recognized from the first object. That is, when the position of the second object is outside the object detection range of the first object, the detection range inside-outside determination unit 107 determines that the second object cannot be recognized from the first object. Further, the detection range inside-outside determination unit 107 determines whether the position identified based on the object information on the first object is outside the object detection range of the second object. With this configuration, the detection range inside-outside determination unit 107 determines whether the first object can be recognized from the second object. That is, when the position of the first object is outside the object detection range of the second object, the detection range inside-outside determination unit 107 determines that the first object cannot be recognized from the second object. The detection range inside-outside determination unit 107 makes the above-mentioned determination for all combinations of objects determined to intersect with each other by the intersection determination unit 106.

The signal output unit 108 outputs the intersection avoidance signal when the object is not recognized by the opponent intersecting object. That is, when the detection range inside-outside determination unit 107 determines that the position of the second object is outside the object detection range of the first object, the signal output unit 108 outputs a signal for avoiding intersection between the first object and the second object (intersection avoidance signal). Similarly, when the detection range inside-outside determination unit 107 determines that the position of the first object is outside the object detection range of the second object, the signal output unit 108 outputs the signal for avoiding the intersection between the first object and the second object (intersection avoidance signal).

For example, the signal output unit 108 outputs a signal instructing the output device 30a, 30b, or 42 to output a message urging avoidance of the intersection (for example, a message calling attention) as the intersection avoidance signal. The signal output unit 108 generates a signal instructing display of a message urging avoidance of the intersection or a signal instructing the voice output of the message urging avoidance of the intersection, and transmits the signal to the output device 30a, 30b, or 42.

Note that, the transmission destination of the intersection avoidance signal may be determined depending on the type of the intersecting object or the intersection position. For example, when any of the first object and the second object that intersect with each other is an object equipped with the output device 42, the signal output unit 108 outputs the intersection avoidance signal to the output device 42 (the object equipped with the output device 42) such that the output device 42 outputs the message. Note that, this message may be a message urging deceleration or stop. As described above, the signal output unit 108 may output a signal instructing the output device provided in the intersecting object to output a message urging avoidance of the intersection as the intersection avoidance signal. With such a configuration, a message urging avoidance of the intersection is output from the output device provided in the object (provided for the traffic participant). Therefore, it is possible to directly call attention to the traffic participants. Further, the signal output unit 108 transmits the intersection avoidance signal to the output device (specifically, the output device 30a or the output device 30b) installed near the intersection position such that the message is output from the output device. As described above, the signal output unit 108 may output a signal instructing the output device provided in the traffic environment to output a message urging avoidance of the intersection as the intersection avoidance signal. With such a configuration, a message urging avoidance of the intersection is output from the output device provided in the traffic environment. Therefore, it is possible to call attention to the traffic participants who do not have the output device.

As the intersection avoidance signal, the signal output unit 108 may output a signal instructing the control device that controls movement of any of the intersecting objects to control avoidance of the intersection. For example, when the vehicle 40 intersects with another object, the signal output unit 108 generates a signal instructing the control device 43 of the vehicle 40 to execute control to avoid the intersection (for example, for deceleration or stop), and transmits the generated signal to the control device 43 (vehicle 40). With such a configuration, when there is a risk of intersection, it is possible to control the movement of the object (traffic participant) that is the party concerned. Therefore, the intersection (collision) can be avoided more reliably.

Further, the signal output unit 108 may output a different intersection avoidance signal when one of the intersecting objects cannot recognize the other object and the other object cannot recognize the one object as well from the intersection avoidance signal to be output when one of the intersecting objects can recognize the other object. That is, when the position of the second object is outside the object detection range of the first object and the position of the first object is outside the object detection range of the second object, the signal output unit 108 may output the intersection avoidance signal as follows. That is, in this case, the signal output unit 108 may output the intersection avoidance signal that is different from the intersection avoidance signal to be output when the position of the second (first) object is within the object detection range of the first (second) object and the position of the first (second) object is outside the object detection range of the second (first) object. Specifically, in this case, the signal output unit 108 outputs a signal for avoiding the intersection more reliably. For example, when one of the intersecting objects can recognize the other object, the signal output unit 108 outputs a signal instructing the output of a message urging deceleration or a signal instructing deceleration control, and outputs a signal instructing the output of a message urging stop or a signal instructing stop control when one of the intersecting objects cannot recognize the other object and the other object cannot recognize the one object as well. It should be noted that these are merely examples, and the signal output unit 108 may use different arbitrary signals (the first signal and the second signal that is a signal for avoiding the intersection more reliably than the first signal) depending on the recognition status. With such a configuration, when neither of the intersecting objects can detect the opponent intersecting object, a signal different from the signal to be output when only one of the intersecting objects cannot detect the other object can be output. Therefore, when the risk is higher, a special signal can be output.

Figure 8:
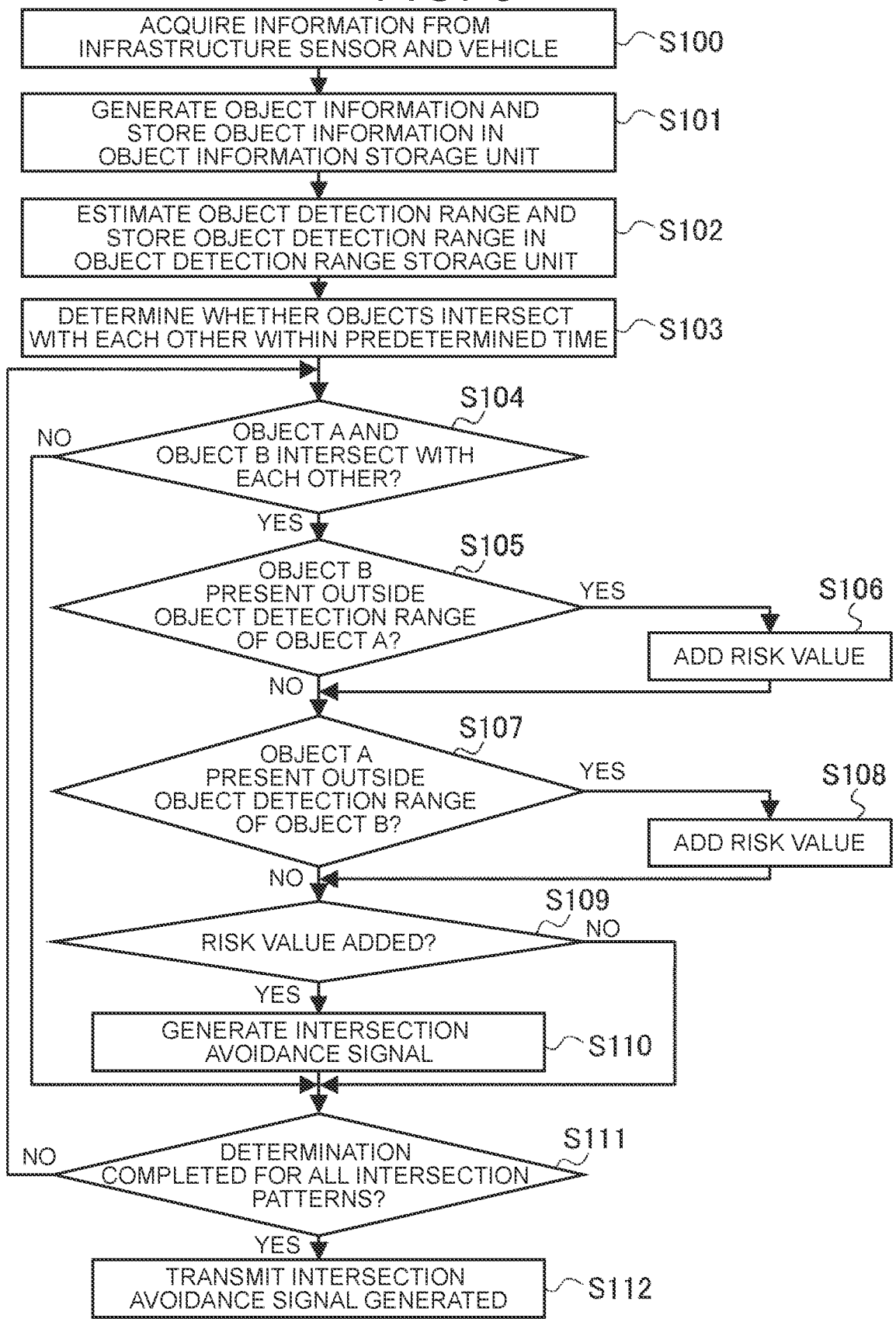
FIG. 8 is a flowchart showing an example of an operation flow of the information processing device according to the embodiment.

Next, an operation flow of the information processing device 10 will be described. FIG. 8 is a flowchart showing an example of the operation flow of the information processing device 10. Hereinafter, an example of the flow of operation will be described with reference to FIG. 8. The information processing device 10 repeats a series of processes shown in FIG. 8, for example, at a predetermined cycle. Note that, the predetermined cycle is sufficiently shorter than the above-mentioned predetermined time used for the intersection determination.

In step S100, the data acquisition unit 100 acquires information from the infrastructure sensor 20 and the vehicle 40. Specifically, the data acquisition unit 100 acquires the sensor data of the infrastructure sensor 20. Further, the data acquisition unit 100 acquires the sensor data of the in-vehicle sensor 41, the position information of the vehicle 40, the movement information of the vehicle 40, and the route information of the vehicle 40 from the vehicle 40. As described above, the data acquisition unit 100 does not necessarily have to acquire a part or all of the above-mentioned types of information from the vehicle 40.

Next, in step S101, the object information generation unit 101 generates object information for each object present in the traffic environment, and stores the generated object information in the object information storage unit 102.

Next, in step S102, the detection range estimation unit 104 estimates the object detection range for each object present in the traffic environment, and stores the estimated object detection range in the object detection range storage unit 105.

Next, in step S103, the intersection determination unit 106 determines whether the objects present in the traffic environment intersect with each other during the time from the present until the predetermined time elapses. When an object A and an object B intersect with each other within the predetermined time (Yes in step S104), the processes after step S105 are executed. When the object A and the object B do not intersect with each other (No in step S104), the process proceeds to step S111.

In step S105, the detection range inside-outside determination unit 107 determines whether the object B is present outside the object detection range of the object A. When the object B is present outside the object detection range of the object A (Yes in step S105), the process proceeds to step S106, and when the object B is not present outside the object detection range (No in step S105), the process proceeds to step S107.

In step S106, the detection range inside-outside determination unit 107 adds a predetermined risk value to an index value indicating the degree of risk of the intersection between the object A and the object B. Note that, the initial value of the index value indicating the degree of risk of the intersection between the object A and the object B is, for example, zero. After step S106, the process proceeds to step S107.

In step S107, the detection range inside-outside determination unit 107 determines whether the object A is present outside the object detection range of the object B. When the object A is present outside the object detection range of the object B (Yes in step S107), the process proceeds to step S108, and when the object A is not present outside the object detection range of the object B (No in step S107), the process proceeds to step S109.

In step S108, the detection range inside-outside determination unit 107 adds the predetermined risk value to the index value indicating the degree of risk of the intersection between the object A and the object B. After step S108, the process proceeds to step S109.

In step S109, the signal output unit 108 determines whether the predetermined risk value is added to the index value indicating the degree of risk of the intersection between the object A and the object B. When the risk value is added (Yes in step S109), the process proceeds to step S110, and when the risk value is not added (No in step S109), the process proceeds to step S111.

In step S110, the signal output unit 108 generates the intersection avoidance signal for avoiding the intersection between the object A and the object B. For example, the signal output unit 108 generates different intersection avoidance signals in accordance with the index value indicating the degree of risk of the intersection between the object A and the object B. For example, when the risk value is added only in either step S106 or step S108, a first signal is generated, and when the risk value is added in both steps S106 and S108, a second signal is generated. The signal output unit 108 generates, for example, as the first signal and the second signal, a signal instructing the output of a message urging avoidance of the intersection. Further, for example, the signal output unit 108 generates, as the first signal and the second signal, a signal instructing control to avoid intersection.

Next, in step S111, the intersection determination unit 106 determines whether the determination has been completed for all the intersection patterns. When the determination is completed for all the intersection patterns (Yes in step S111), the process proceeds to step S112. When the determination is not completed for all the intersection patterns (No in step S111), the process returns to step S104, and the processes in step S104 to step S110 are repeated for other combinations of intersections.

In step S112, the signal output unit 108 transmits the intersection avoidance signal generated in step S110. For example, the signal output unit 108 transmits the intersection avoidance signal to the output device provided near the intersection between the object A and the object B. Further, the signal output unit 108 transmits the intersection avoidance signal to the output device provided in the object A and the output device provided in the object B. When a predetermined cycle elapses after step S112, the processes in steps S100 to S112 are repeated again.

Here, an example of transmitting the intersection avoidance signal in the traffic environment shown in FIG. 2 will be described. In the example shown in FIG. 2, it is assumed that the vehicle 40 and the pedestrian 50 intersect with each other, and the pedestrian 50 and the bicycle 60 also intersect with each other within a predetermined time. In this case, for example, the signal output unit 108 transmits the intersection avoidance signal instructing the output device 30*a* and the output device 42 to output a message urging avoidance of the intersection so as to avoid the intersection between the vehicle 40 and the pedestrian 50. Note that, the signal output unit 108 may transmit the intersection avoidance signal instructing control to avoid intersection to the control device 43, in place of the intersection avoidance signal transmitted to the output device 42 or together with the intersection avoidance signal transmitted to the output device 42. In this case, for example, the signal output unit 108 transmits the intersection avoidance signal instructing the output device 30b to output a message urging avoidance of the intersection so as to avoid the intersection between the pedestrian 50 and the bicycle 60.

Figure 9:
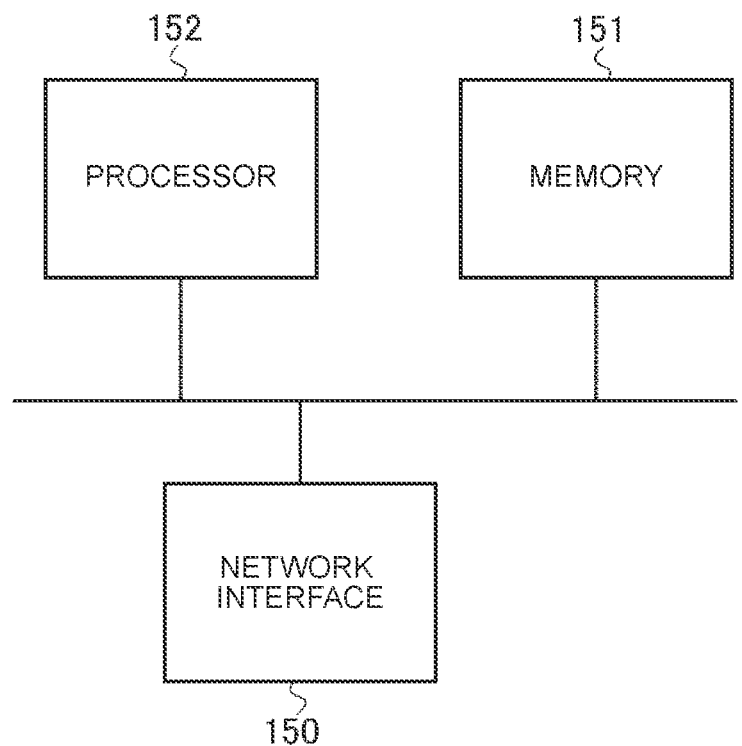
FIG. 9 is a block diagram showing a functional configuration of the information processing device according to the embodiment.

Next, an example of a hardware configuration of the information processing device 10 will be described. FIG. 9 is a diagram showing an example of the hardware configuration of the information processing device 10. The information processing device 10 includes, for example, a network interface 150, a memory 151, a processor 152, and the like.

The network interface 150 is used to communicate with other devices (for example, the infrastructure sensor 20, vehicle 40, and output devices 30a, 30b). The network interface 150 may include, for example, a network interface card (NIC).

The memory 151 is composed of, for example, a combination of a volatile memory and a non-volatile memory. The memory 151 is used to store a program or the like executed by the processor 152. The object information storage unit 102, the map information storage unit 103, and the object detection range storage unit 105 are realized by a storage device such as the memory 151.

The processor 152 reads the program from the memory 151 and executes the program to execute processes of the information processing device 10 (specifically, the data acquisition unit 100, the object information generation unit 101, the detection range estimation unit 104, the intersection determination unit 106, the detection range inside-outside determination unit 107 and the signal output unit 108). The processor 152 may be, for example, a microprocessor, a microprocessor unit (MPU), a central processing unit (CPU), or the like.

The program described above includes a set of instructions (or software code) for causing the computer to perform one or more of the functions described in the embodiments when loaded into the computer. The program may be stored in a non-transitory computer-readable medium or a tangible storage medium. The examples of the computer-readable medium or the tangible storage medium include, but are not limited to, a random-access memory (RAM), a read-only memory (ROM), a flash memory, a solid-state drive (SSD) or other memory technologies, a compact disc read-only memory (CD-ROM), a digital versatile disc (DVD), a Blu-ray (registered trademark) disc, or other optical disc storages, a magnetic cassette, a magnetic tape, a magnetic disc storage, or other magnetic storage devices. The program may be transmitted on a transitory computer-readable medium or a communication medium. The example of the transitory computer-readable medium or the communication medium include, but is not limited to, an electrical, optical, acoustic, or other form of propagating signal.

The embodiment has been described as above. According to the information processing device 10, the object detection range, that is, the field of view is estimated for each object (traffic participant) that may possibly intersect. When the opponent intersecting object is present outside the object detection range, the signal for avoiding the intersection is output. Therefore, according to the information processing device 10, it is possible to appropriately avoid intersection between the traffic participants.

Note that, the present disclosure is not limited to the above embodiment, and can be appropriately modified without departing from the spirit. For example, in the above-described embodiment, the intersection avoidance signal is output even when one of the intersecting objects can recognize the other object. However, the intersection avoidance signal may be output only when one of the intersecting objects cannot recognize the other object and the other object cannot recognize the one object as well. Further, in the above-described embodiment, the object information generation unit 101 generates the object information based on the sensor data of the infrastructure sensor 20. However, the object information may be generated based on the sensor data of the in-vehicle sensor 41. That is, the object information generation unit 101 may generate the object information on an object other than the vehicle from the information acquired from the vehicle. In this case, the object information generation unit 101 may identify the position of the object in the traffic environment using, for example, the position of the in-vehicle sensor 41 (vehicle 40) and the relative position of the object detected by the in-vehicle sensor 41 from the in-vehicle sensor 41. Further, the object information generation unit 101 may identify movement of the object (the moving speed and the moving direction) based on the temporal transition of the relative position of the object detected by the in-vehicle sensor 41 and transmitted from the in-vehicle sensor 41 and the temporal transition of the position of the in-vehicle sensor 41 (vehicle 40). Then, the object information generation unit 101 may analyze the sensor data of the in-vehicle sensor 41 and identify the type of the object and the like.

What is claimed is:

1. An information processing device comprising a processor that:

acquires sensor data from a sensor that is provided in a traffic environment and senses an object present in the traffic environment;

generates object information that is information for identifying at least a position and movement for each of the objects based on the sensor data;

estimates an object detection range based on at least partial information constituting the object information, the object detection range being a range in which another object is detectable for each of the objects;

determines whether the objects intersect with each other within a predetermined time based on at least partial information constituting the object information;

determines whether a position of a second object, among the objects, identified based on the object information is outside the object detection range of a first object among the objects, and determines whether a position of the first object identified based on the object information is outside the object detection range of the second object, the second object intersecting with the first object within the predetermined time; and outputs a signal for avoiding intersection between the first object and the second object when the position of the second object is outside the object detection range of the first object or when the position of the first object is outside the object detection range of the second object, wherein the processor estimates the object detection range from which a blind spot region created by an obstacle identified based on three-dimensional map information on the traffic environment is excluded.

2. The information processing device according to claim 1, wherein the processor estimates the object detection range from which a blind spot region created by the object for which the object information is generated is excluded.

3. The information processing device according to claim 1, wherein:
the processor generates the object information that also identifies a type of the object; and
the processor estimates the object detection range based on a default detection range prepared for each type of the object.

4. The information processing device according to claim 1, wherein:
the processor acquires sensor data of an in-vehicle sensor that senses an object around a vehicle present in the traffic environment and a position of the vehicle from the vehicle; and
the processor estimates the object detection range of the object that is a vehicle based on the sensor data of the in-vehicle sensor and the position of the vehicle acquired from the vehicle.

5. The information processing device according to claim 1, wherein:
the processor acquires route information of a vehicle present in the traffic environment from the vehicle; and
the processor determines whether the vehicle intersects with another object within a predetermined time using the route information of the vehicle.

6. The information processing device according to claim 1, wherein when the position of the second object is outside the object detection range of the first object and the position of the first object is outside the object detection range of the second object, the processor outputs the signal different from the signal to be output when the position of the second object is within the object detection range of the first object and the position of the first object is outside the object detection range of the second object.

7. The information processing device according to claim 1, wherein the processor outputs a signal instructing an output device provided in the traffic environment to output a message urging avoidance of intersection as the signal for avoiding the intersection between the first object and the second object.

8. The information processing device according to claim 1, wherein the processor outputs a signal instructing an output device provided in the first object or the second object to output a message urging avoidance of intersection as the signal for avoiding the intersection between the first object and the second object.

9. The information processing device according to claim 1, wherein the processor outputs a signal instructing a control device that controls movement of the first object or the second object to execute control to avoid intersection as the signal for avoiding the intersection between the first object and the second object.

10. An information processing method, comprising:
acquiring sensor data from a sensor that is provided in a traffic environment and senses an object present in the traffic environment;
generating object information that is information for identifying at least a position and movement for each of the objects based on the sensor data;
estimating an object detection range based on at least partial information constituting the object information, the object detection range being a range in which another object is detectable for each of the objects;
determining whether the objects intersect with each other within a predetermined time based on at least partial information constituting the object information;
determining whether a position of a second object, among the objects, identified based on the object information is outside the object detection range of a first object among the objects, and determines whether a position of the first object identified based on the object information is outside the object detection range of the second object, the second object intersecting with the first object within the predetermined time; and
outputting a signal for avoiding intersection between the first object and the second object when the position of the second object is outside the object detection range of the first object or when the position of the first object is outside the object detection range of the second object, wherein the object detection range is estimated from which a blind spot region created by an obstacle identified based on three-dimensional map information on the traffic environment is excluded.

11. A non-transitory computer-readable medium storing a program that causes a computer to execute steps comprising:
a data acquisition step of acquiring sensor data from a sensor that is provided in a traffic environment and senses an object present in the traffic environment;
an object information generation step of generating object information that is information for identifying at least a position and movement for each of the objects based on the sensor data;
a detection range estimation step of estimating an object detection range based on at least partial information constituting the object information, the object detection range being a range in which another object is detectable for each of the objects;
an intersection determination step of determining whether the objects intersect with each other within a predetermined time based on at least partial information constituting the object information;
a detection range inside-outside determination step of determining whether a position of a second object, among the objects, identified based on the object information is outside the object detection range of a first object among the objects, and determines whether a position of the first object identified based on the object information is outside the object detection range of the second object, the second object intersecting with the first object within the predetermined time; and
a signal output step of outputting a signal for avoiding intersection between the first object and the second object when the position of the second object is outside the object detection range of the first object or when the position of the first object is outside the object detection range of the second object, wherein the object detection range is estimated from which a blind spot region created by an obstacle identified based on three-dimensional map information on the traffic environment is excluded.

* * * * *